L. B. BARTON.
Wheel-Cultivator.

No. 47,380. Patented Apr. 25, 1865.

UNITED STATES PATENT OFFICE.

LESTER B. BARTON, OF METAMORA, ILLINOIS.

IMPROVEMENT IN CULTIVATORS.

Specification forming part of Letters Patent No. 47,380, dated April 25, 1865.

*To all whom it may concern:*

Be it known that I, LESTER B. BARTON, of Metamora, in the county of Woodford and State of Illinois, have invented a new and Improved Cultivator; and I do hereby declare that the following is a full, clear, and exact description of the same, reference being had to the accompanying drawings, making a part of this specification, in which—

Figure 1:
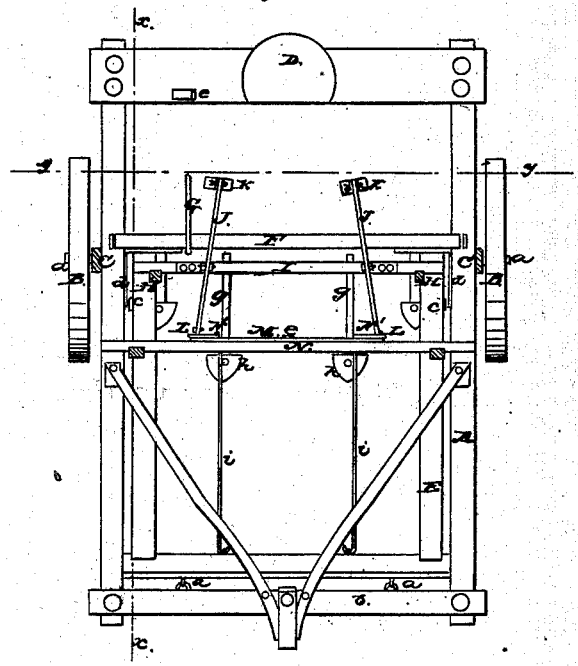
Figure 2:
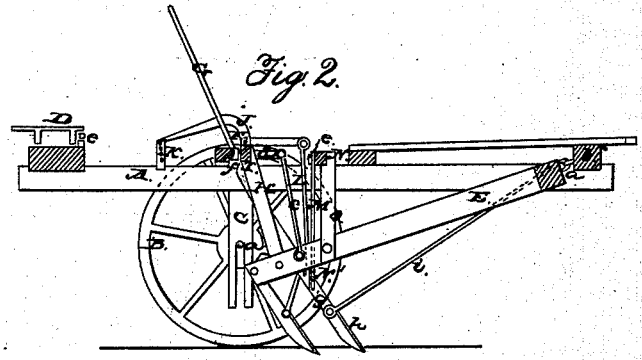
Figure 3:
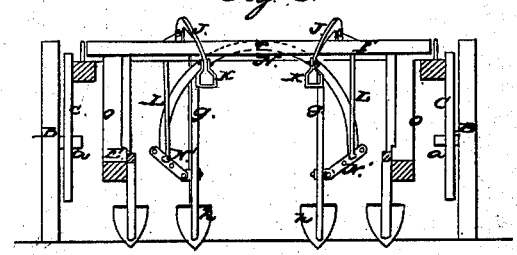

Figure 1 is a plan or top view of my invention; Fig. 2, a side sectional view of the same, taken in the line $x\ x$, Fig. 1; Fig. 3, a transverse vertical section of the same, taken in the line $y\ y$, Fig. 1.

Similar letters of reference indicate corresponding parts in the several figures.

This invention relates to an improved cultivator of that class in which the plows or shovels have a lateral adjustable movement, in order that they may be made to conform to the sinuosities of the rows of plants and cast the earth up to the same, or cast it therefrom without the liability of plowing out the plants or injuring the roots thereof.

The object of the invention is to obtain a cultivator of the class specified which will admit of the plows or shovels being moved or adjusted with the greatest facility, so that they will be under the complete control of the operator.

To enable those skilled in the art to fully understand and construct my invention, I will proceed to describe it.

A represents a rectangular frame, which is mounted on two wheels, B B, the axes $a$ of which are fitted in slotted pendants C to admit of the frame A being adjusted higher or lower, as may be desired.

D is the driver's seat, which is placed on the back part of the frame A, and E is a frame which is fitted within the frame A, and has its front end connected by hinges or joints $a$ to the front cross-piece, $b$, of the frame A. The back part of the frame E is connected by rods $c\ c$ to arms $d\ d$, which project at right angles from the front side of a rock-shaft, F, placed transversely on the frame A, and having a lever, G, attached to it. By actuating this lever the frame E may be raised and lowered, and it may be retained in an elevated state by placing the rear part of the lever G under a hook or catch, $e$, on the frame A.

To the back part of the frame E there are attached two uprights, H H, one at each side, and connected at their upper ends by a cross-bar, I, to which two levers, J J, are connected. The latter have each a stirrup, K, suspended to its back end. The front ends of the levers J J are connected by rods L to the lower ends of a semicircular or bow-shaped bar, M, which is connected at its center by a pivot, $e$, with a bar, N, which is attached to standards O O, one at each side of the frame E. The bar M is allowed to swing freely on the pivot $e$.

To the cross-bar I there are attached by joints $f\ f$ two standards, $g\ g$, having shovels or plows $h\ h$ at their lower ends. The joints $f\ f$ admit of the standards $g$ swinging laterally. The standards $g\ g$ are braced by rods $i\ i$ from the front end of the frame E.

The lower ends of the curved bar M are connected by links N' N' with the shovel or plow standards $g\ g$.

From the above description it will be seen that the driver, by means of his feet in the stirrups K K, may move the shovels or plows laterally, so that they may conform to the sinuosities of the rows of plants. When the shovels or plows are at work the lever G is released from the hook or catch $e$, and the frame E is allowed to be in a depressed state, so that the shovels and plows may enter the earth. In turning the machine at the ends of rows, or in transporting it from place to place, the frame E is raised and the lever G placed under the hook $e$.

Having thus described my invention, what I claim as new, and desire to secure by Letters Patent, is—

The hinged or jointed frame E, placed within the main frame A, as shown, in combination with the laterally-swinging shovel or plow standards $g\ g$, levers J J, with stirrups K K attached, and the curved or bow-shaped bar M, all arranged to operate substantially as and for the purpose herein set forth.

LESTER B. BARTON.

Witnesses:
W. H. DELPH,
EDGAR BABCOCK.